United States Patent
He et al.

(10) Patent No.: US 11,499,094 B1
(45) Date of Patent: Nov. 15, 2022

(54) RATIOMETRIC FLUORESCENT PROBE, PREPARATION METHOD THEREOF, AND APPLICATION IN DETECTION OF HYDROGEN PEROXIDE

(71) Applicant: Zhejiang University, Hangzhou (CN)

(72) Inventors: Yong He, Hangzhou (CN); Yongqiang Shi, Hangzhou (CN); Xuping Feng, Hangzhou (CN); Lei Lin, Hangzhou (CN); Fangfang Qu, Hangzhou (CN); Mingzhu Tao, Hangzhou (CN)

(73) Assignee: Zhejiang University, Hangzhou (CN)

( * ) Notice: Subject to any disclaimer, the term of this patent is extended or adjusted under 35 U.S.C. 154(b) by 0 days.

(21) Appl. No.: 17/575,775

(22) Filed: Jan. 14, 2022

(30) Foreign Application Priority Data

Nov. 1, 2021 (CN) .......................... 202111281819.6

(51) Int. Cl.
| | |
|---|---|
| *C09K 11/06* | (2006.01) |
| *C09K 11/54* | (2006.01) |
| *C09K 11/60* | (2006.01) |
| *C09K 11/68* | (2006.01) |
| *C09K 11/08* | (2006.01) |
| *B01J 31/16* | (2006.01) |
| *G01N 21/64* | (2006.01) |
| *C01G 39/02* | (2006.01) |
| *C09K 11/02* | (2006.01) |
| *B82Y 20/00* | (2011.01) |

(52) U.S. Cl.
CPC .............. *C09K 11/68* (2013.01); *C01G 39/02* (2013.01); *C09K 11/02* (2013.01); *G01N 21/643* (2013.01); *B82Y 20/00* (2013.01)

(58) Field of Classification Search
CPC ......... C09K 11/02; C09K 11/06; C09K 11/08; C09K 11/54; C09K 11/68; C09K 11/60; C09K 2211/183; G01N 21/643; G01N 21/6428; C01G 39/02; B01J 31/1691
See application file for complete search history.

(56) References Cited

U.S. PATENT DOCUMENTS

| | | | |
|---|---|---|---|
| 2019/0127234 A1* | 5/2019 | Aizenberg | ............. C01G 25/02 |
| 2019/0386185 A1* | 12/2019 | Jiang | ..................... H01L 33/501 |

OTHER PUBLICATIONS

Zhang, "Facile construction of MoO3@ZIF-8 core-shell nanorods for efficient photoreduction of aqueous Cr (VI)", Aug. 31, 2018, Applied Catalysis B:Environmental, 240, pp. 92-101. (Year: 2018).*

* cited by examiner

*Primary Examiner* — Matthew E. Hoban
*Assistant Examiner* — Lynne Edmondson
(74) *Attorney, Agent, or Firm* — Troutman Pepper Hamilton Sanders LLP; Christopher C. Close, Jr.

(57) ABSTRACT

The present disclosure provides a ratiometric fluorescent probe, a preparation method thereof, and an application in detection of hydrogen peroxide. In the present disclosure, $MoO_x$ QDs (nanoenzymes) and Co/Zn-MOFs both have catalytic activity, and the large specific surface area and porous structure of Co/Zn-MOFs can provide more binding sites for the contact between nanoenzymes and substrates. Moreover, Co/Zn-MOFs have high catalytic activity similar to natural enzymes. When nanoenzymes with fluorescent properties encounter Co/Zn-MOFs with similar catalytic activity, they will collide with a spark of "synergy catalysis", and the fusion of the two plays a role of synergy catalysis; in addition, the uniform cavity of Co/Zn-MOFs can provide "hosts" for nanoenzymes, and Co/Zn-MOFs provide "anchors" for $MoO_x$ QDs, avoiding the aggregation of $MoO_x$ QDs and enhancing the stability of the probe.

8 Claims, 16 Drawing Sheets

RATIOMETRIC FLUORESCENT PROBE, PREPARATION METHOD THEREOF, AND APPLICATION IN DETECTION OF HYDROGEN PEROXIDE

CROSS REFERENCE TO RELATED APPLICATIONS

This patent application claims the benefit and priority under 35 U.S.C. § 119(e) of 202111281819.6 filed on 1 Nov. 2021, the disclosure of which is incorporated by reference herein in its entirety as part of the present application.

TECHNICAL FIELD

The present disclosure relates to the technical field of detection of hydrogen peroxide content, in particular to a ratiometric fluorescent probe, a preparation method thereof, and an application in detection of hydrogen peroxide.

BACKGROUND ART

Hydrogen peroxide is widely used in industrial fields such as food, environment, and pharmaceuticals. However, the abuse of $H_2O_2$ may cause DNA damage and apoptosis, and is significantly related to the defense of plants against pathogens and various human diseases (such as cancer, Alzheimer's disease and Parkinson's disease). Therefore, the development of fast and reliable $H_2O_2$ detection methods plays an important role in food safety, environmental protection and maintenance of human health. At present, the methods used for $H_2O_2$ detection mainly include high performance liquid chromatography, electrochemical method, fluorescence spectroscopy method and colorimetric method. Among them, the fluorescence spectroscopy method has the characteristics of high sensitivity, good selectivity, short response time and strong real-time monitoring ability, which has good application prospects in the detection of biomolecules.

At present, various fluorescent molecular probes have been used for $H_2O_2$ detection, such as 2',7'-dichlorodihydrofluorescein (DCFH), naphthimide and 10-acetyl-3,7-dihydroxybenzoxazine (Amplex Red), which usually use the chemical group of the probe molecule as the reaction site to detect $H_2O_2$ by measuring the fluorescence intensity of a single emission peak. Due to its single emission, the sensing stability is easily affected by surrounding environmental factors. Compared with the traditional single fluorescent signal probe, the ratiometric fluorescent probe with built-in correction function can provide higher stability by using the ratio of the fluorescence intensities of the two emission sites as the output signal. In addition, the fluorescent quantum dots that are not protected by the ratiometric fluorescent probe in the solution are prone to aggregation, which will affect the sensing performance and further reduce the stability of the ratiometric fluorescent probe.

SUMMARY

In view of this, the purpose of the present disclosure is to provide a ratiometric fluorescent probe, a preparation method thereof, and an application in the detection of hydrogen peroxide. The ratiometric fluorescent probe prepared by the present disclosure contains a metal organic frame and molybdenum oxide quantum dots, which improves the stability of the detection.

In order to achieve the above purpose, the present disclosure provides the following technical schemes:

The present disclosure provides a method for preparing a ratiometric fluorescent probe, wherein comprising the following steps:

Mixing a soluble cobalt salt, a soluble zinc salt, a molybdenum oxide quantum dot solution, 4,4'-bibenzoic acid and N, N-dimethylformamide, and performing a hydrothermal reaction to obtain the ratiometric fluorescent probe.

In some embodiments, the molar ratio of the cobalt ion in the soluble cobalt salt to the zinc ion in the soluble zinc salt is 0.5-4:1.

In some embodiments, the molar ratio of cobalt ion in the soluble cobalt salt to 4,4'-bibenzoic acid is 1:1.2.

In some embodiments, the temperature of the hydrothermal reaction is 110-130° C., and the time is 12-24 h.

In some embodiments, the molybdenum oxide quantum dot solution is prepared by a method comprising the following steps:

Mixing $MoS_2$ nano-powders with a $H_2O_2$ solution to obtain a mixed solution;

Adjusting the pH value of the mixed solution to 6-8, and performing a redox reaction to obtain a redox reactant;

Centrifuging the redox reactant to obtain the molybdenum oxide quantum dot solution.

The present disclosure also provides a ratiometric fluorescent probe prepared by the preparation method described in above technical schemes, wherein comprising Co/Zn-MOFs and molybdenum oxide quantum dots, the molybdenum oxide quantum dots are supported on the surface of Co/Zn-MOFs, and the ratiometric fluorescent probe has a *hydrangea*-like structure.

The present disclosure also provides the application of the ratiometric fluorescent probe described in above technical schemes in the detection of hydrogen peroxide.

In some embodiments, the application comprises the following steps:

Under dark conditions, mixing the ratiometric fluorescent probe with an o-phenylenediamine solution to obtain a mixed solution;

Mixing the mixed solution with the substance to be tested, then incubating to obtain an incubation material; and the substance to be tested contains $H_2O_2$;

Performing fluorescence detection on the incubation material to obtain the fluorescence intensity;

Calculating the content of $H_2O_2$ in the substance to be tested by a standard equation, and the standard equation is an equation with $H_2O_2$ molar concentration as the independent variable and fluorescence intensity as the dependent variable.

In some embodiments, the wavelength of the fluorescence detection is 330 nm.

In some embodiments, the mass ratio of the ratiometric fluorescent probe to the o-phenylenediamine in the o-phenylenediamine solution is 5:8.

The present disclosure provides a method for preparing a ratiometric fluorescent probe, comprising the following steps: Mixing a soluble cobalt salt, a soluble zinc salt, a molybdenum oxide quantum dot solution, 4,4'-bibenzoic acid and N, N-dimethylformamide, and performing a hydrothermal reaction to obtain the ratiometric fluorescent probe ($MoO_x$ QDs@Co/Zn-MOFs). The $MoO_x$ QDs (nanoenzymes) and Co/Zn-MOFs prepared by the present disclosure have catalytic activity. The large specific surface area and porous structure of Co/Zn-MOFs can provide more binding sites for the contact between nanoenzymes and substrates. Moreover, Co/Zn-MOFs have high catalytic activity similar to natural enzymes. When nanoenzymes with fluorescent properties encounter Co/Zn-MOFs with similar catalytic activity, they will collide with a spark of "synergy catalysis", and the fusion of the two plays a role of synergy catalysis; in addition, the uniform cavity of Co/Zn-MOFs can provide "hosts" for nanoenzymes, and Co/Zn-MOFs provide "anchors" for $MoO_x$ QDs, avoiding the aggregation of $MoO_x$ QDs and enhancing the stability of the probe. Therefore, the construction of fluorescent probes based on nanoenzymes with fluorescent properties and Co/Zn-MOFs materials to enhance the sensitivity and stability of $H_2O_2$ detection will have important research significance and application value.

The preparation method provided by the present disclosure has the advantages of simple synthesis, small amount of raw materials, relatively low price, and high product yield.

The present disclosure also provides a ratiometric fluorescent probe prepared by the preparation method described in the above technical scheme, including Co/Zn-MOFs and molybdenum oxide quantum dots, the molybdenum oxide quantum dots are supported on the surface of Co/Zn-MOFs, and the ratiometric fluorescent probe has a *hydrangea*-like structure, which increases the contact area with the substrate, makes the catalytic activity get full play, improves the detection sensitivity of the system, and makes up for the shortcomings of the traditional method such as slow detection speed, high detection cost, poor detection stability and low sensitivity.

DETAILED DESCRIPTION OF THE EMBODIMENTS

Figure 1:
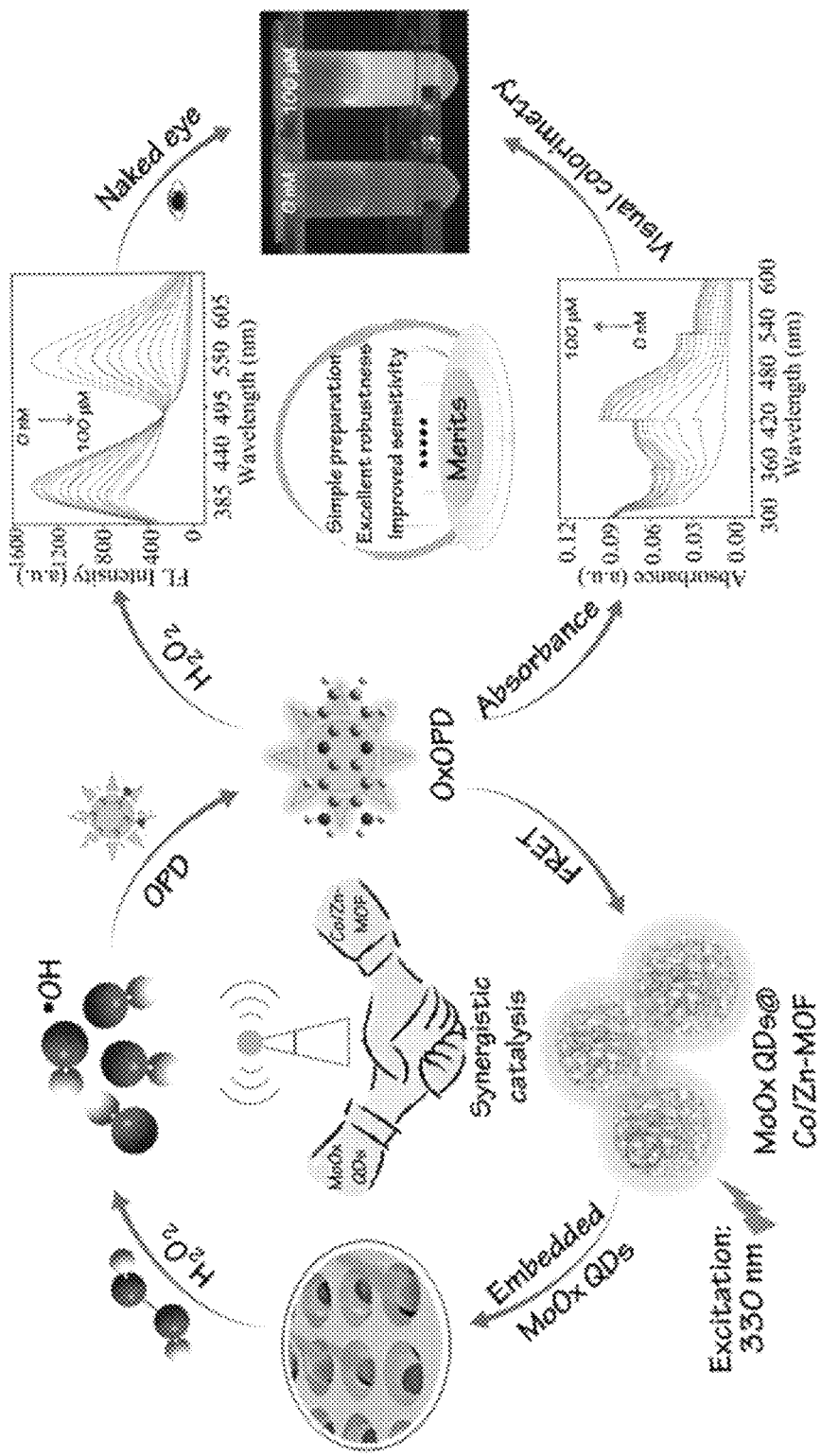
FIG. 1 shows the principle of $H_2O_2$ detection by $MoO_x$ QDs@Co/Zn-MOFs probe.

The present disclosure provides a method for preparing a ratiometric fluorescent probe, wherein comprising the following steps:

Mixing a soluble cobalt salt, a soluble zinc salt, a molybdenum oxide quantum dot solution, 4,4'-bibenzoic acid and N, N-dimethylformamide, and performing a hydrothermal reaction to obtain the ratiometric fluorescent probe.

In the present disclosure, the molar ratio of the cobalt ion in the soluble cobalt salt to the zinc ion in the soluble zinc salt is preferably 0.5-4:1, more preferably 2:1. In the present disclosure, the soluble cobalt salt is preferably $Co(NO_3)_2 \cdot 6H_2O$, and the soluble zinc salt is preferably $Zn(NO_3)_2 \cdot 6H_2O$.

In the present disclosure, the molar ratio of cobalt ion in the soluble cobalt salt to 4,4'-bibenzoic acid is preferably 1:1.2.

In the present disclosure, the dosage ratio of cobalt ion in the soluble cobalt salt to N, N-dimethylformamide is preferably 1 mmol: 20 mL.

In the present disclosure, the temperature of the hydrothermal reaction is preferably 110-130° C., more preferably 120° C., and the time is preferably 12-24 h.

In the present disclosure, the hydrothermal reaction is preferably carried out in a reactor.

In the present disclosure, the molybdenum oxide quantum dot solution is preferably prepared by a method comprising the following steps:

Mixing $MoS_2$ nano-powders with the $H_2O_2$ solution to obtain a mixed solution;

Adjusting the pH value of the mixed solution to 6-8, and performing a redox reaction to obtain a redox reactant;

Centrifuging the redox reactant to obtain the molybdenum oxide quantum dot solution ($MoO_x$ QDs solution).

In the present disclosure, the $MoS_2$ nano-powder is mixed with the $H_2O_2$ solution to obtain a mixed solution.

In the present disclosure, the dosage ratio of the $MoS_2$ nano-powders to the $H_2O_2$ solution is preferably 20.0 mg: 20 mL, and the $H_2O_2$ solution is preferably prepared by mixing 30 wt % hydrogen peroxide and water in a volume ratio of 2:3. In the present disclosure, the $MoS_2$ and $H_2O_2$ are used as the molybdenum source and oxidant, respectively.

After the mixed solution is obtained, the pH value of the mixed solution is adjusted to 6-8 and then a redox reaction is carried out to obtain a redox reactant.

In the present disclosure, the pH value is preferably 7.

In the present disclosure, sodium hydroxide is preferably used to adjust the pH value. The present disclosure has no special limitation on the amount of sodium hydroxide, as long as the pH value can reach 6-8.

The present disclosure does not specifically limit the temperature and time of the redox reaction, as long as it is carried out at room temperature.

After the redox reactant is obtained, the redox reactant is centrifuged to obtain the molybdenum oxide quantum dot solution.

In the present disclosure, the rotation speed of the centrifugation is preferably 10000 rpm, the time is preferably 10 min, and the supernatant obtained by the centrifugation is the molybdenum oxide quantum dot solution.

In the present disclosure, the amount ratio of cobalt ion in the soluble cobalt salt to molybdenum oxide quantum dot solution is preferably 1 mmol: 2.5 mL.

In the present disclosure, it is preferable to add the 4,4'-bibenzoic acid after mixing the soluble cobalt salt, soluble zinc salt and molybdenum oxide quantum dot solution.

After the hydrothermal reaction is completed, in the present disclosure, the obtained hydrothermal reaction product is preferably subjected to centrifugation, DMF washing, ethanol solution washing and drying in sequence to obtain the ratiometric fluorescent probe.

In the present disclosure, the number of the DMF washing and the ethanol solution washing is preferably 3 times.

In the present disclosure, the drying temperature is preferably 70° C., and the time is preferably 12 h.

The present disclosure also provides a ratiometric fluorescent probe prepared by the preparation method described in the above technical scheme, which includes Co/Zn-MOFs and molybdenum oxide quantum dots, the molybdenum oxide quantum dots are supported on the surface of Co/Zn-MOFs, and the ratiometric fluorescent probe has a *hydrangea*-like structure.

FIG. 1 shows the principle of $H_2O_2$ detection with $MoO_x$ QDs@Co/Zn-MOFs probe.

The present disclosure also provides the application of the ratiometric fluorescent probe described in the above technical scheme in the detection of hydrogen peroxide.

In the present disclosure, the application preferably includes the following steps:

Under dark conditions, mixing the ratiometric fluorescent probe with an o-phenylenediamine solution to obtain a mixed solution;

Mixing the mixed solution with the substance to be tested, then incubating to obtain an incubation material; and the substance to be tested contains $H_2O_2$;

Performing fluorescence detection on the incubation material to obtain the fluorescence intensity;

Calculating the content of $H_2O_2$ in the substance to be tested by a standard equation, and the standard equation is an equation with $H_2O_2$ molar concentration as the independent variable and fluorescence intensity as the dependent variable.

In the present disclosure, the wavelength of the fluorescence detection is preferably 330 nm.

In the present disclosure, the mass ratio of the ratiometric fluorescent probe to the o-phenylenediamine in the o-phenylenediamine solution is preferably 5:8.

In the present disclosure, the ratiometric fluorescent probe is preferably used in the form of a ratiometric fluorescent probe solution, and the concentration of the ratiometric fluorescent probe solution is preferably 0.5 mg/mL.

In the present disclosure, the concentration of the o-phenylenediamine solution is preferably 0.5 mg/mL.

In order to further illustrate the present disclosure, the ratiometric fluorescent probe provided by the present disclosure, the preparation method thereof and application in the detection of hydrogen peroxide are described in detail below in conjunction with examples, but they should not be understood as limiting the scope of protection of the present disclosure.

Example 1

Preparation and characterization of fluorescent nano-probe $MoO_x$ QDs@Co/Zn-MOFs:

(1) Preparation of $MoO_x$ QDs: 20.0 mg of $MoS_2$ nanopowder was mixed with 20 mL of $H_2O_2$ solution (prepared by 30 wt % $H_2O_2$ solution and $H_2O$ in a volume ratio of 2:3), the mixture was stirred at room temperature for 2 h, and the pH value of the mixture was adjusted to 7 with sodium hydroxide. Finally, the resulting mixture was centrifuged at 10000 rpm for 10 min to collect the $MoO_x$ QDs solution.

(2) Preparation of $MoO_x$ QDs@Co/Zn-MOFs: 1.0 mmol of cobalt nitrate ($Co(NO_3)_2 \cdot 6H_2O$), 0.5 mmol of zinc nitrate ($Zn(NO_3)_2 \cdot 6H_2O$) and 2.5 mL of $MoO_x$ QDs solution were dissolved in 20 mL of N, N-dimethylformamide solution and stirred for 5 min, and then 1.2 mmol of 4,4'-bibenzoic acid was added to the above solution and stirred for 30 min. Then, the above mixture was transferred to a reactor and heated in an oven at 120° C. for 12 h. After the hydrothermal reaction was completed, the above product was centrifuged, washed with DMF and ethanol solution for 3 times, and dried at 70° C. for 12 h to obtain the $MoO_x$ QDs@Co/Zn-MOFs fluorescent probe.

Figure 2A:
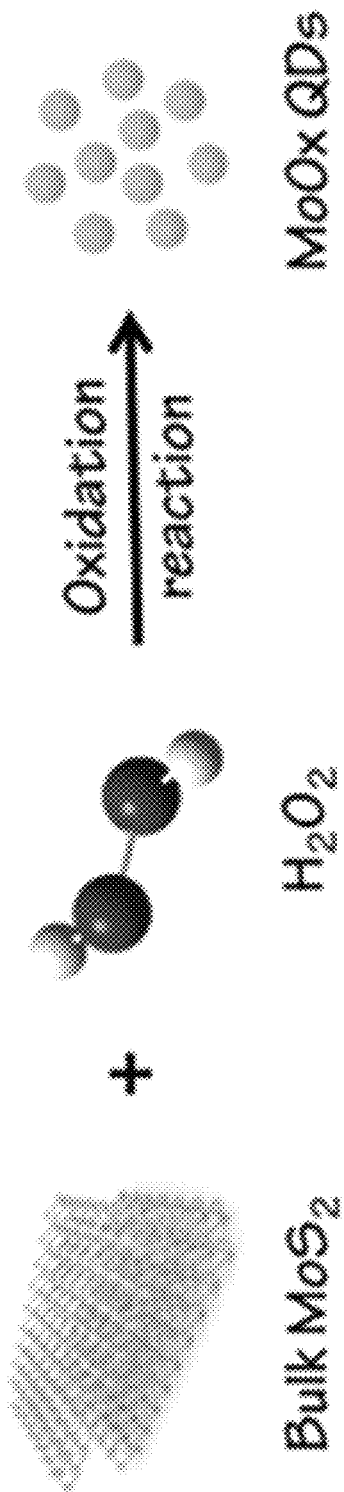
FIG. 2A is a schematic diagram of the preparation of $MoO_x$ QDs.
Figure 2B:
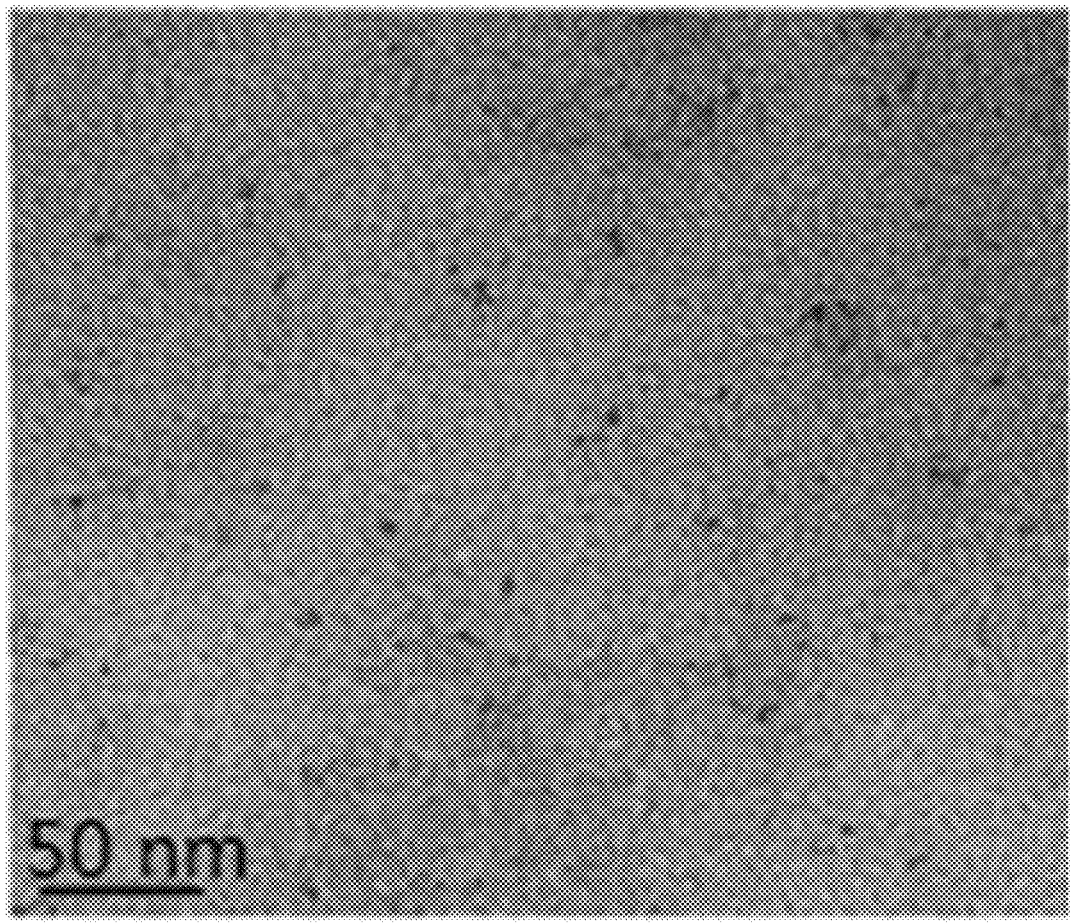
FIG. 2B is a TEM image of $MoO_x$ QDs.
Figure 2C:
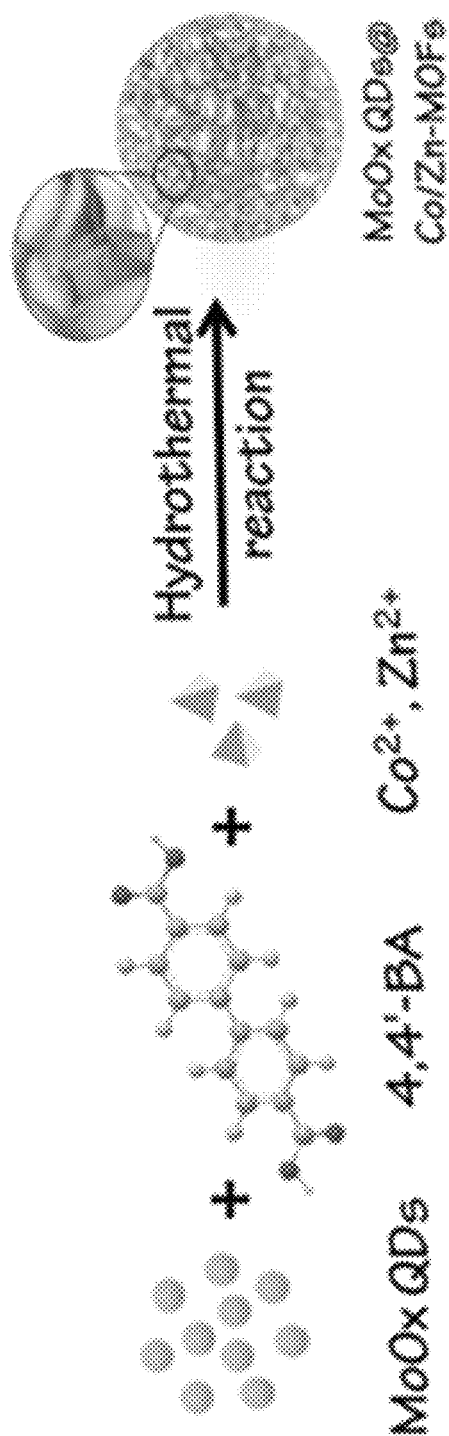
FIG. 2C is a schematic diagram of the preparation of $MoO_x$ QDs@Co/Zn-MOFs.
Figure 2D:
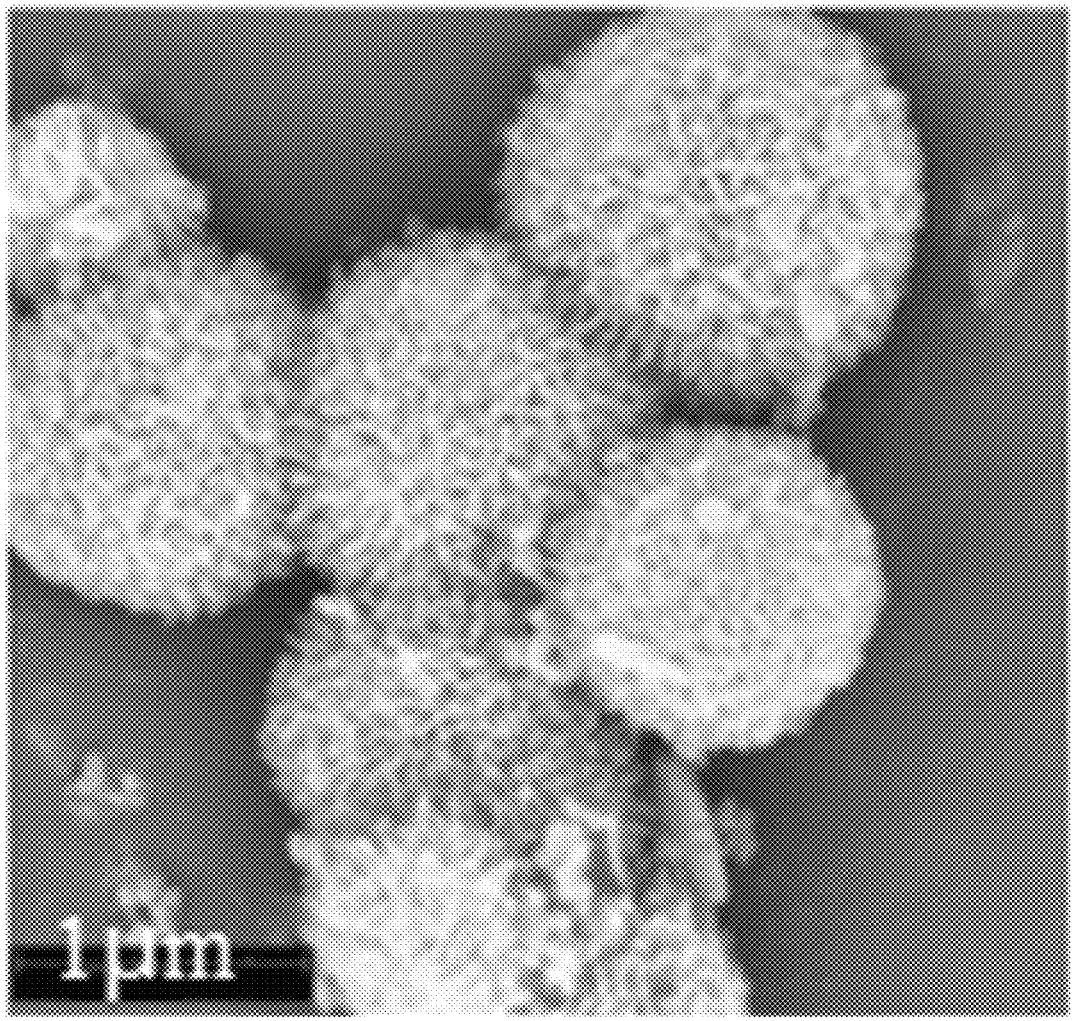
FIG. 2D is a SEM image of $MoO_x$ QDs@Co/Zn-MOFs.
Figure 3A:
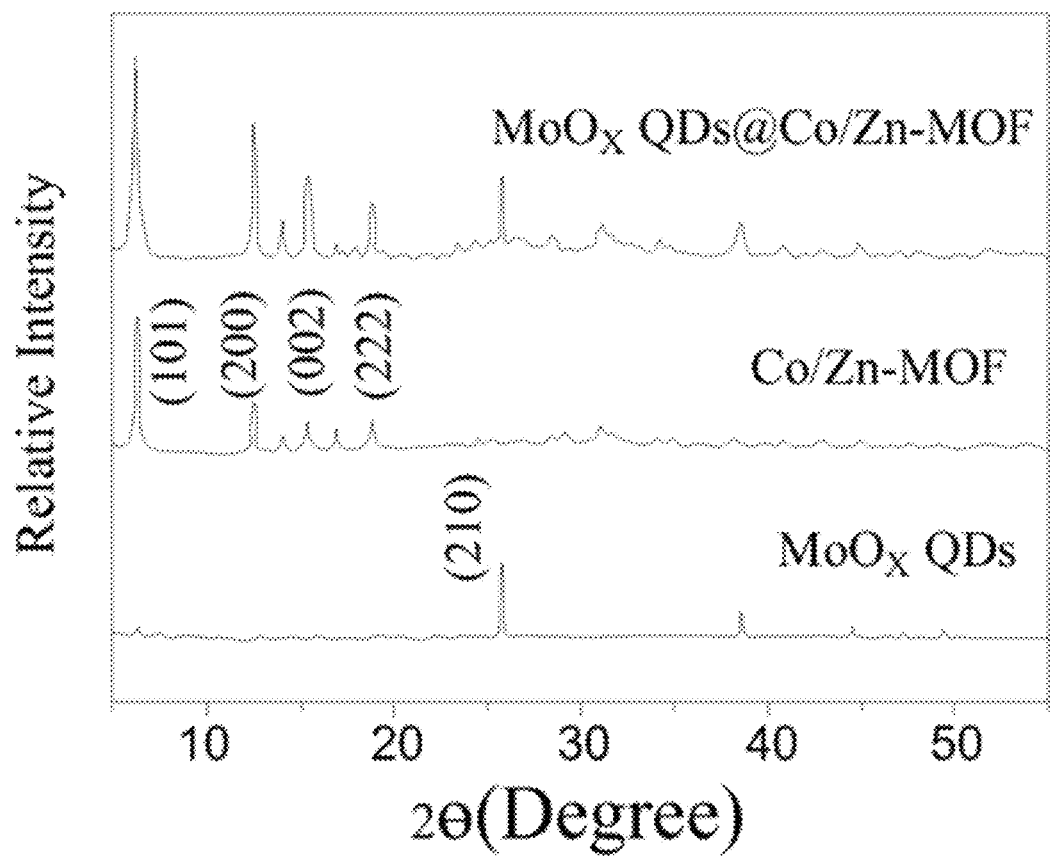
FIG. 3A is the XRD pattern of the prepared material.
Figure 3B:
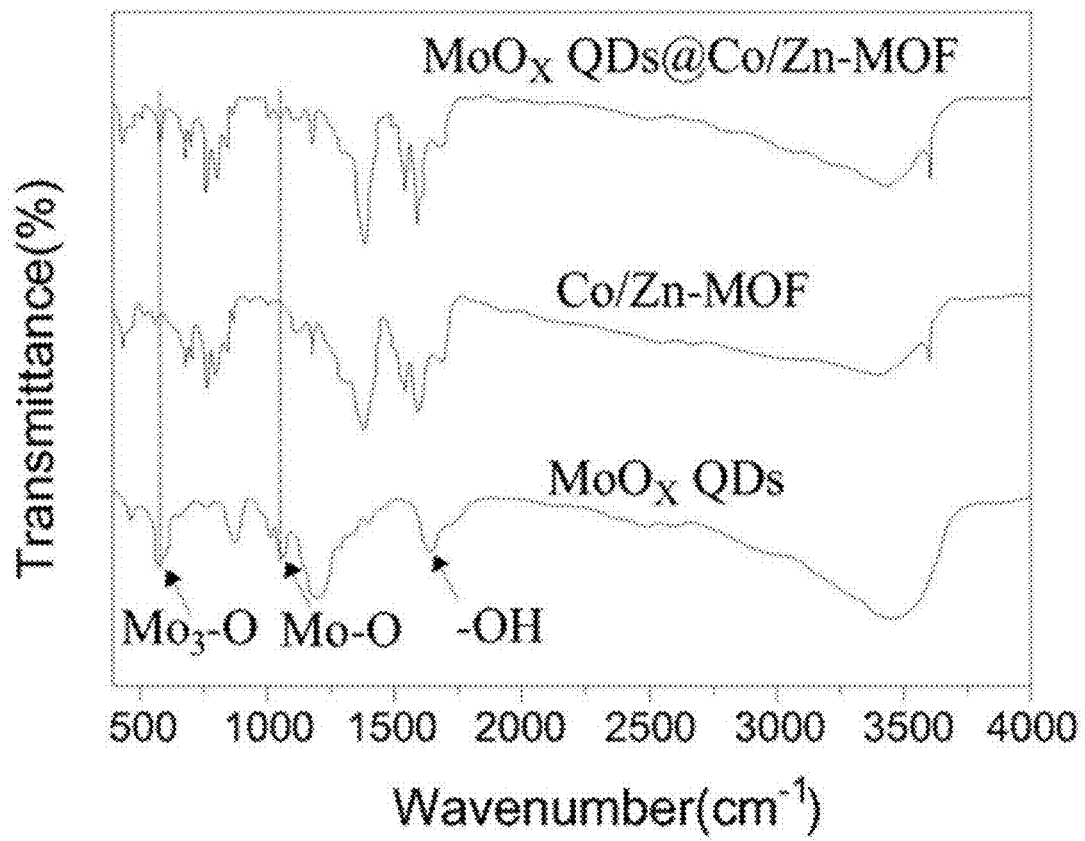
FIG. 3B is the FT-IR spectrum of the prepared material.
Figure 3C:
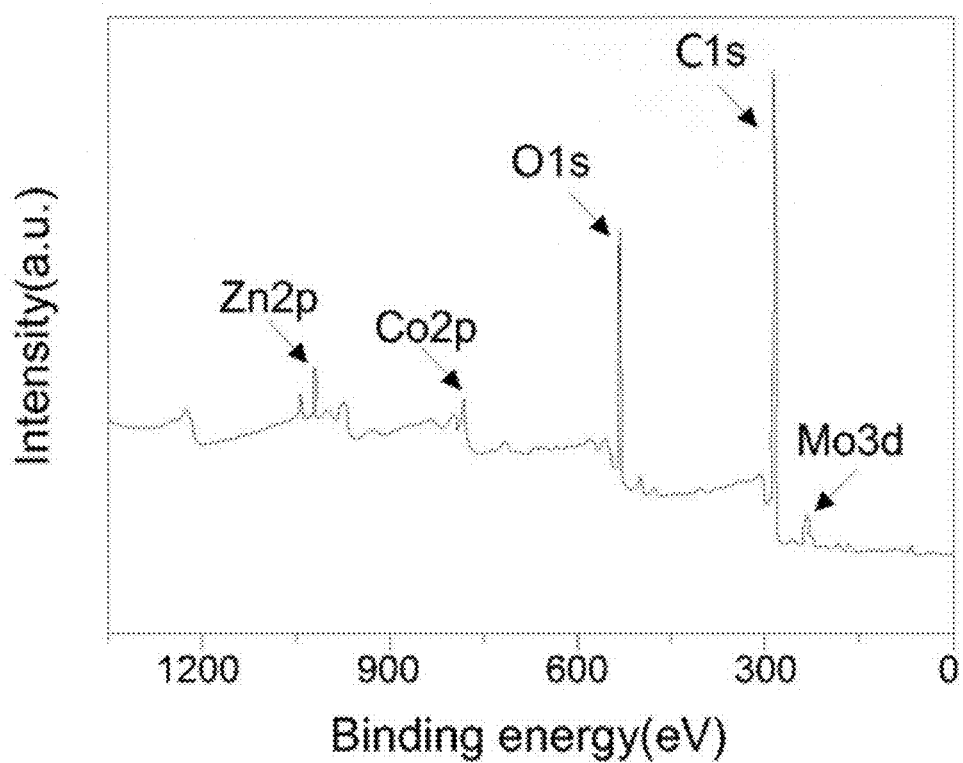
FIG. 3C is the XPS full spectrum of $MoO_x$ QDs@Co/Zn-MOFs.
Figure 3D:
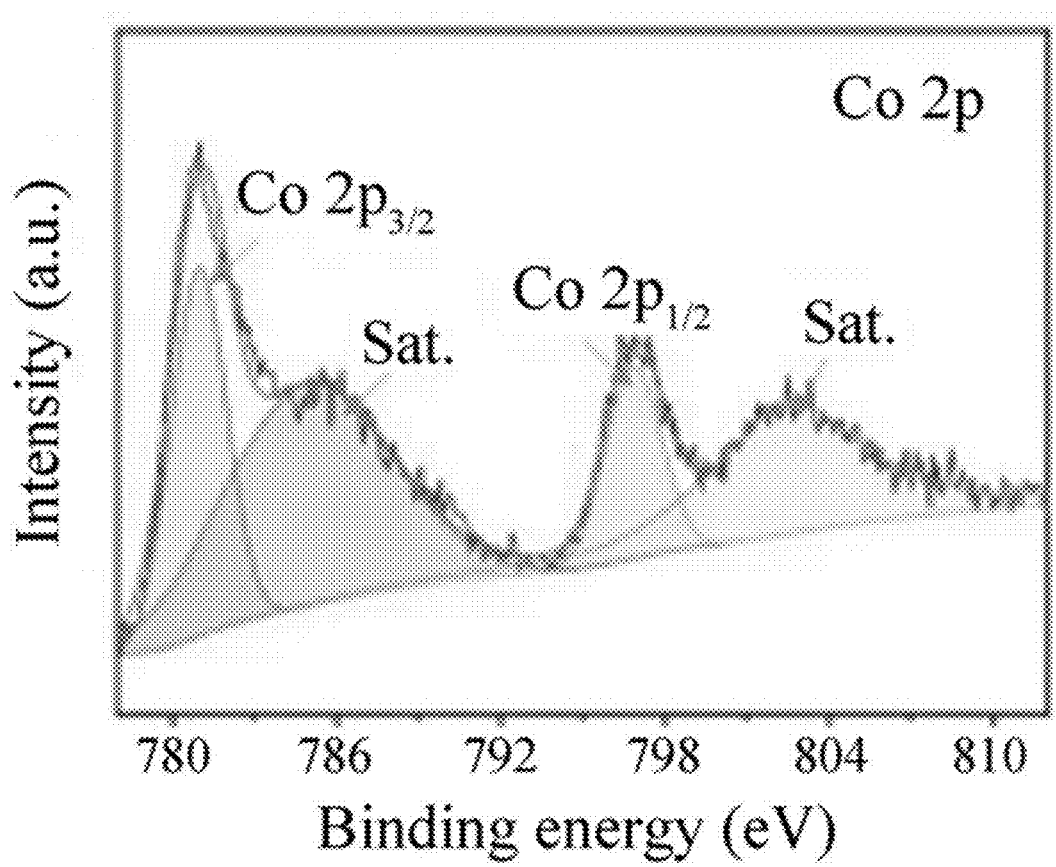
FIG. 3D is a spectrum of Co 2p.
Figure 3E:
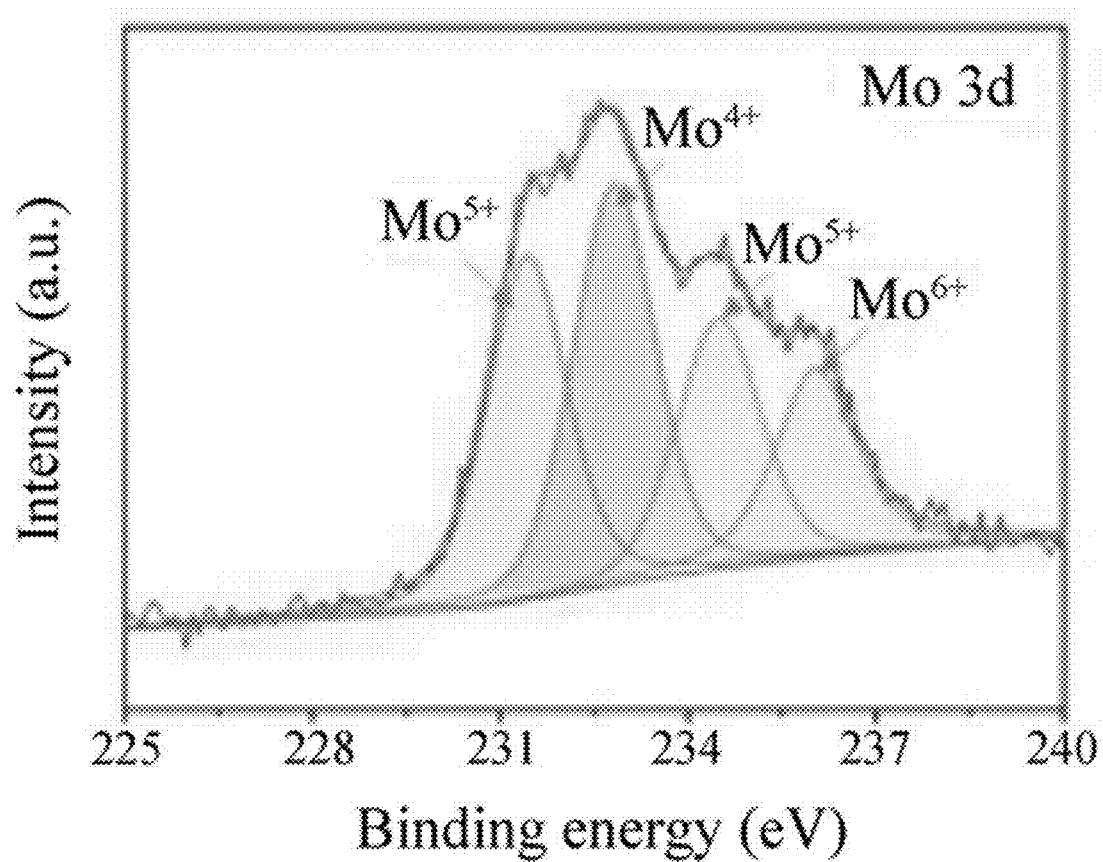
FIG. 3E is a spectrum of Mo 3d.
Figure 3F:
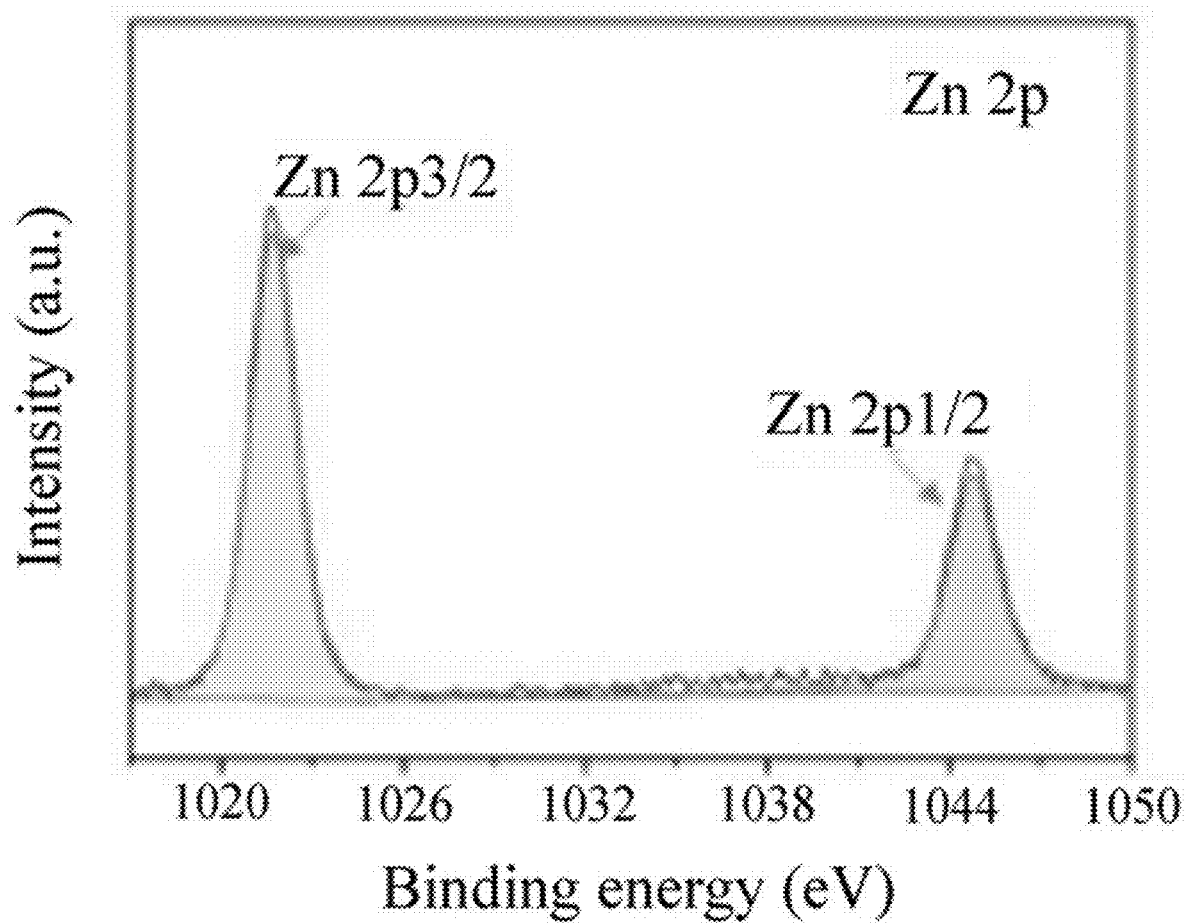
FIG. 3F is a spectrum of Zn 2p.

(3) The $MoO_x$ QDs and $MoO_x$ QDs@Co/Zn-MOFs obtained above were characterized by TEM, SEM, XRD, FTIR, and XPS. The specific results are shown in FIGS. 2A-3F. FIG. 2A is a schematic diagram of the preparation of $MoO_x$ QDs, FIG. 2B is a TEM image of $MoO_x$ QDs, FIG. 2C is a schematic diagram of the preparation of $MoO_x$ QDs@Co/Zn-MOFs, FIG. 2D is a SEM image of $MoO_x$ QDs@Co/Zn-MOFs;

FIG. 3A is the XRD pattern of the prepared material, FIG. 3B is the FT-IR spectrum of the prepared material, FIG. 3C is the XPS full spectrum of $MoO_x$ QDs@Co/Zn-MOFs, FIG. 3D is the spectrum of Co 2p, FIG. 3E is the spectrum of Mo 3d, FIG. 3F is the spectrum of Zn 2p; From the TEM image of $MoO_x$ QDs and the SEM image of $MoO_x$ QDs@Co/Zn-MOFs in FIGS. 2A through 2D, it can be seen that both are successfully prepared; from the XRD, FTIR and XPS spectra in FIGS. 3A through 3F, it can be seen that $MoO_x$ QDs are successfully modified to Co/Zn-MOFs.

Figure 4A:
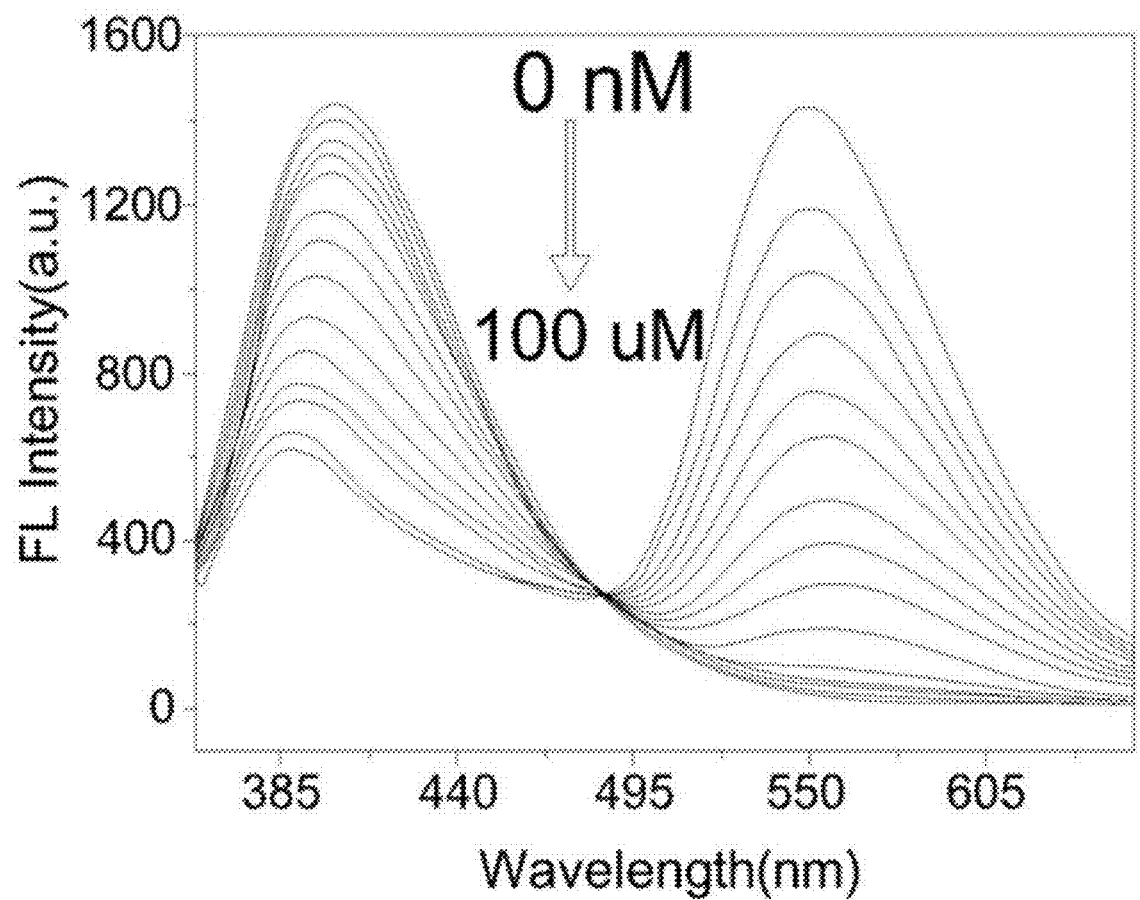
FIG. 4A is the fluorescence spectra of the prepared probes exposed to different concentrations of $H_2O_2$.
Figure 4B:
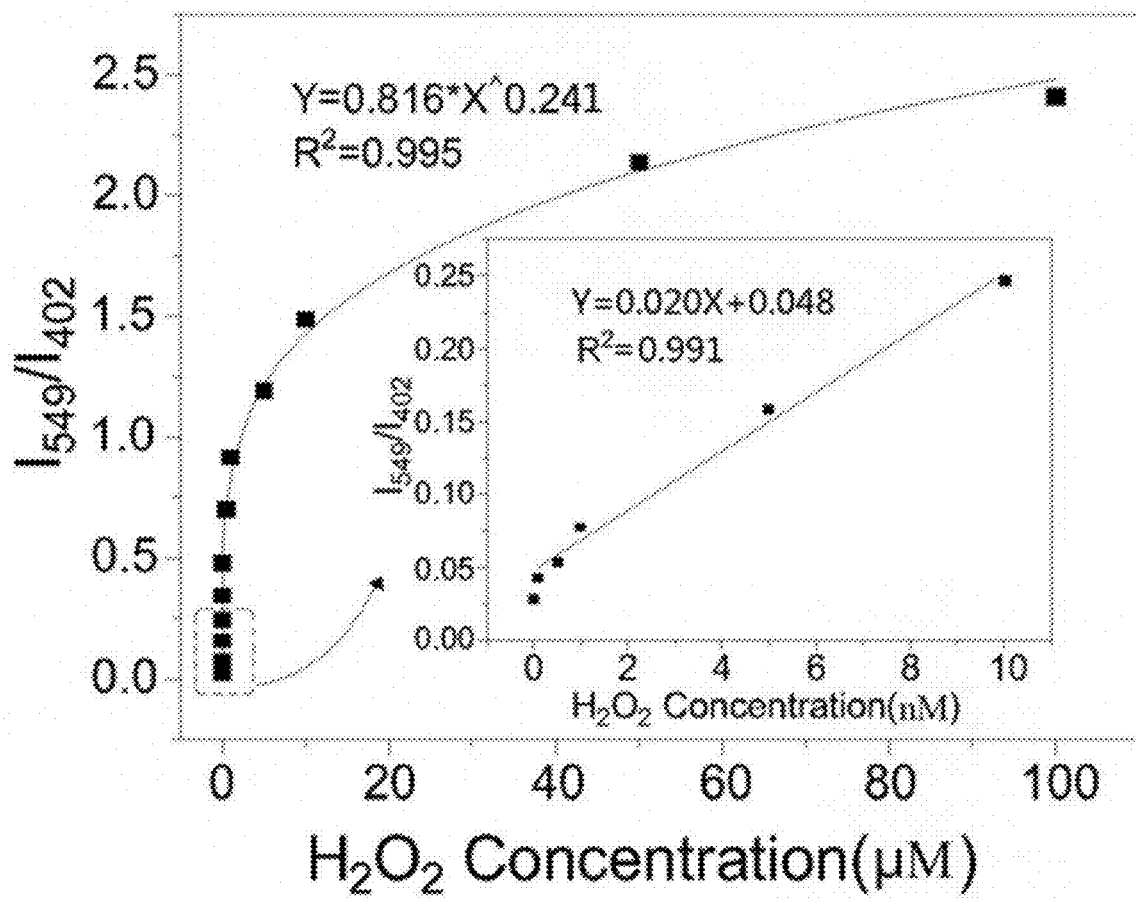
FIG. 4B shows the relationship between the response signal of the prepared probes and the concentration of $H_2O_2$.
Figure 5A:
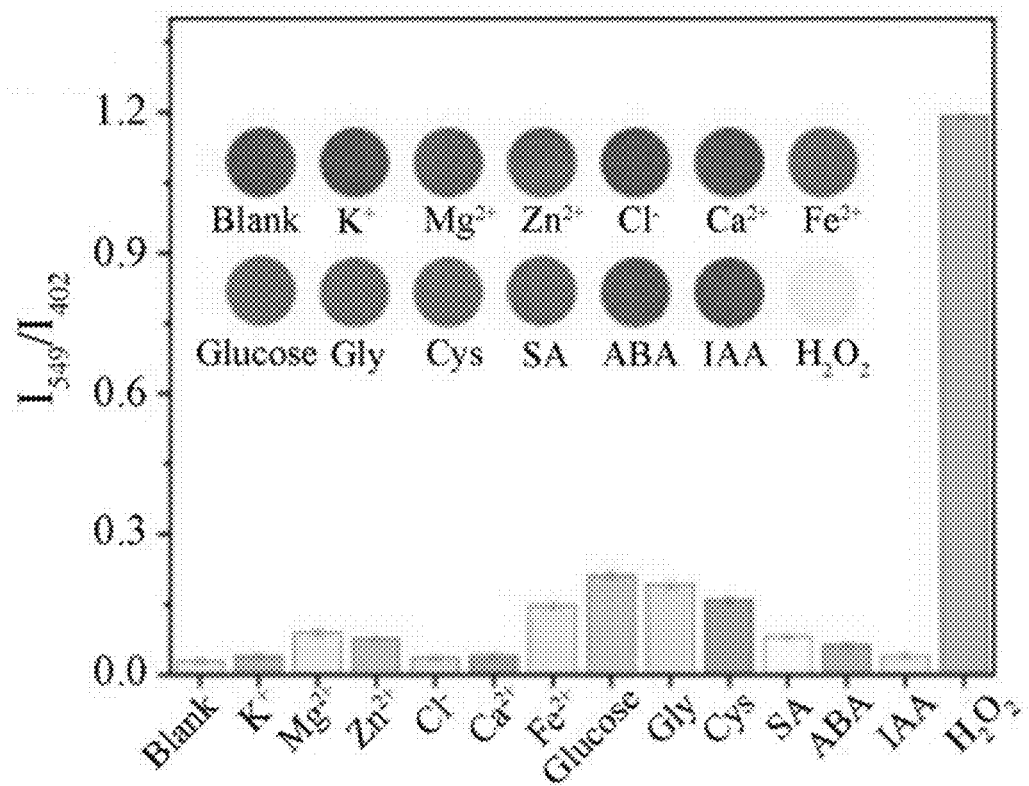
FIG. 5A is the response value of the prepared probe to the interference (where the $H_2O_2$ concentration is 5.0 μmol/L, and the interference concentration is 50 μmol/L), the inset shows the fluorescence color change of the probe in the presence of the interference.
Figure 5B:
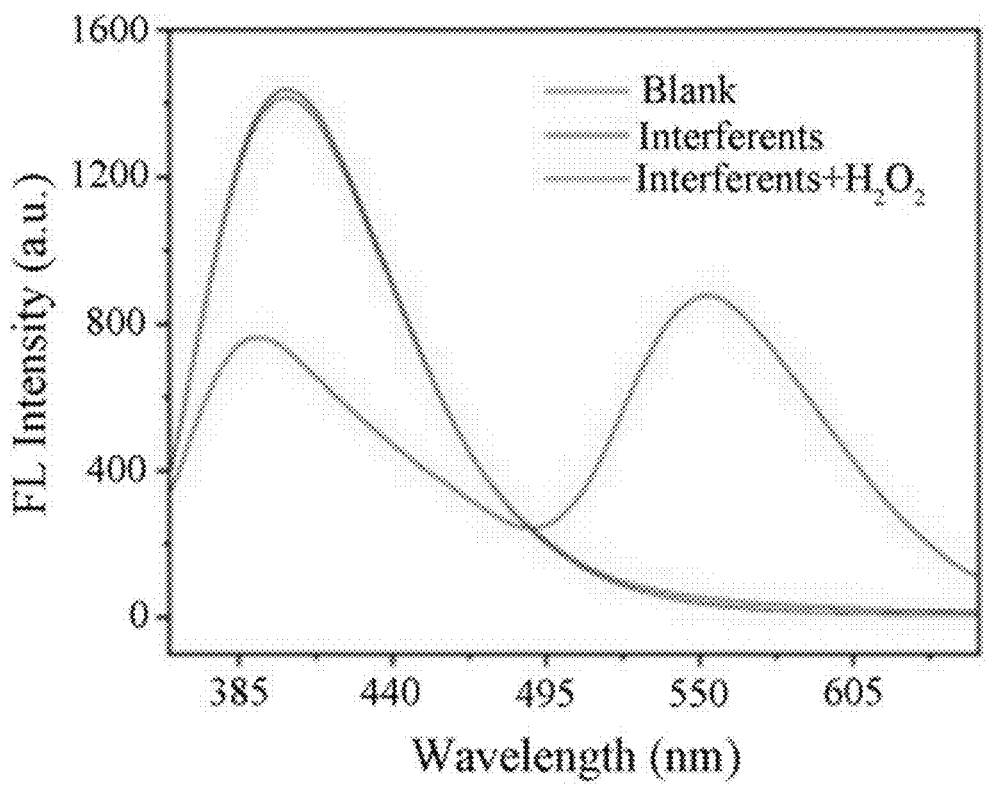
FIG. 5B is the fluorescence spectra of the prepared probes exposed to 5.0 μmol/L $H_2O_2$ and the same concentration of interference.

The use of fluorescent nano-probe $MoO_x$ QDs@Co/Zn-MOFs in $H_2O_2$ detection:

(1) Establishment of standard curve for $H_2O_2$ detection: 500 μL of the obtained $MoO_x$ QDs@Co/Zn-MOFs (0.5 mg/mL) solution was mixed with 500 μL of o-phenylenediamine (0.8 mg/mL) solution, and stirred continuously in the dark for 10 min at room temperature. 300 μL of $H_2O_2$ standard solutions of different concentrations were added to the above mixture and incubated for 4 min. Then, the fluorescence spectra of the above mixtures were measured and recorded using a fluorescence spectrometer at an excitation wavelength of 330 nm, a quantitative model was established based on the relationship between the fluorescence intensity and the concentration of $H_2O_2$ to predict the concentration of $H_2O_2$, and the selectivity of the probe was tested. The specific results are shown in FIGS. 4A-5B. FIG. 4A is the fluorescence spectra of the prepared probes exposed to different concentrations of $H_2O_2$, and FIG. 4B shows the relationship of the response signal of the prepared probe with the change of $H_2O_2$ concentration; FIG. 5A is the response value of the prepared probe to interference (where the $H_2O_2$ concentration is 5.0 μmol/L and the interference concentration is 50 μmol/L), the inset shows the fluorescence color change of the probe in the presence of the interference, FIG. 5B is the fluorescence spectra of the prepared probes exposed to 5.0 μmol/L $H_2O_2$ and the same concentration of interference.

It can be seen from FIGS. 4A and 4B that the detection range of the prepared probe is 0.1 nmol/L-100 μmol/L. The lower detection limit indicates that the probe has a higher sensitivity to $H_2O_2$, which is attributed to the synergistic catalytic effect of $MoO_x$ QDs@Co/Zn-MOFs.

The results in FIGS. 5A and 5B show that the probe has good selectivity, which lays the foundation for its practical application.

Figure 6:
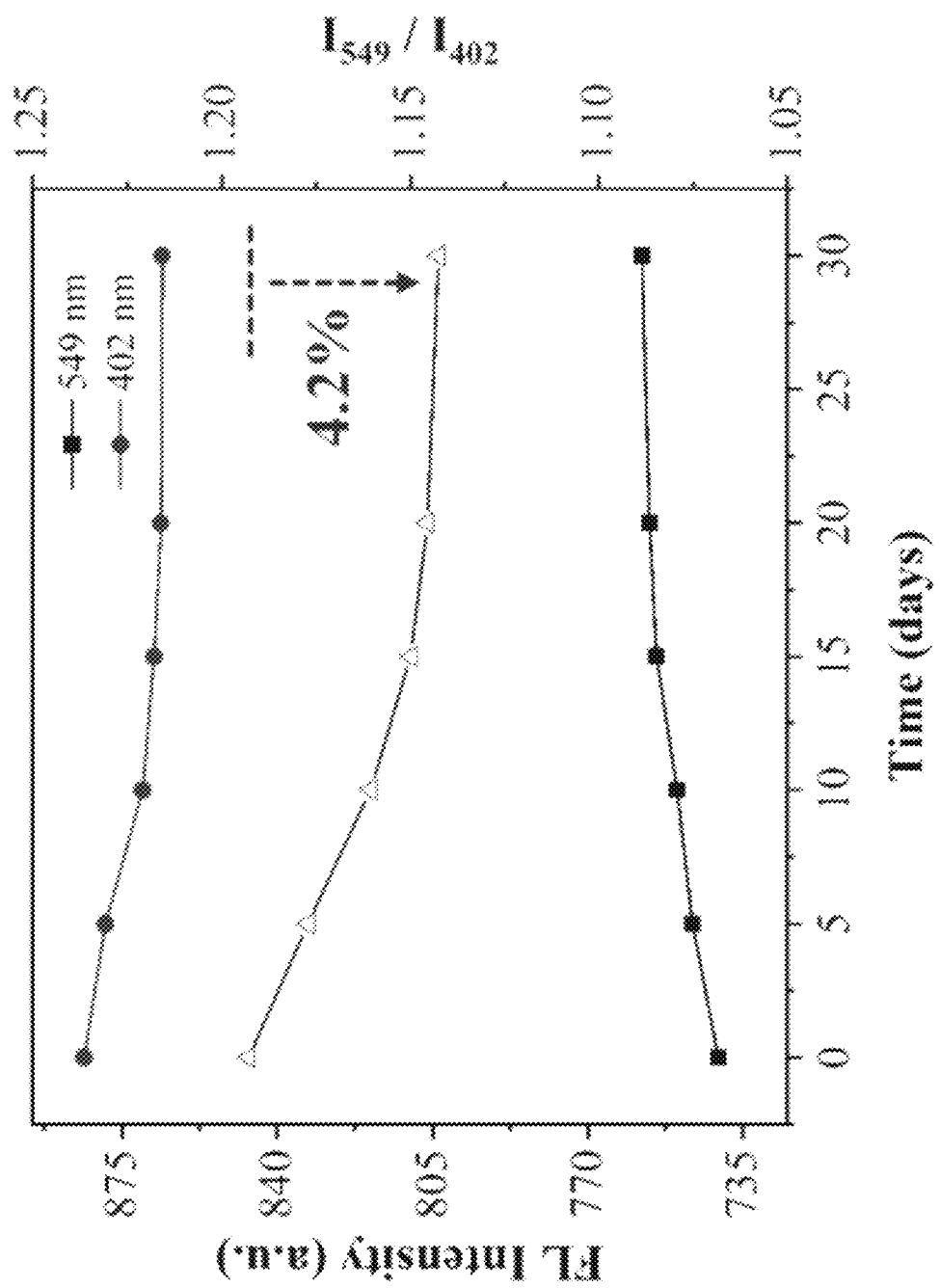
FIG. 6 shows the response value of the prepared probe after storage for 0-30 d.

After placing the probe in a refrigerator at 4° C. for 30 d, the fluorescence signal of the probe is gradually stabilized (see FIG. 6), and its response value is only 4.2% lower than the initial value, indicating that the probe has good stability.

(2) Detection of $H_2O_2$ in actual samples using the method in step (1): the standard addition method was used to detect $H_2O_2$ in milk and lake water samples. First, the actual sample was pre-treated, taking the milk sample (5 mL) as an example, the same volume of milk and deionized water were mixed, and 2 mL of 10 wt % trichloroacetic acid solution was added to precipitate the protein in the milk, then the milk sample was subjected to ultrasonic treatment for 15 min and centrifuged at 10000 rpm for 15 min to remove protein precipitates, the supernatant was collected and filtered with a 0.22 μm dialysis membrane, and then different concentrations of $H_2O_2$ were added to the above supernatant to form a solution to be tested. The method established in step (1) was used to detect the solution to be tested and the results were compared with the actual added concentration. The specific results are shown in Table 1. The recovery is between 97.4%-110.0%, indicating that the probe can be used for detection in actual samples and has high detection accuracy.

TABLE 1

Detection results of $H_2O_2$ in actual samples

| sample | standard addition concentration (μM) | fluorometry | | |
|---|---|---|---|---|
| | | detection result (μM) | recovery (%) | RSD (%, n = 3) |
| lake water | 1.00 | 1.06 | 106.0 | 1.38 |
| | 10.00 | 9.74 | 97.4 | 2.15 |
| | 50.00 | 49.85 | 99.7 | 1.94 |
| milk | 1.00 | 1.10 | 110.0 | 2.72 |
| | 10.00 | 10.17 | 101.7 | 3.06 |
| | 50.00 | 50.52 | 101.0 | 2.47 |

The above are only the preferred embodiments of the present disclosure, and do not limit the present disclosure in any form. It should be pointed out that for those of ordinary skill in the art, without departing from the principle of the present disclosure, several improvements and modifications can be made, and these improvements and modifications should also be regarded as the protection scope of the present disclosure.

What is claimed is:

1. A ratiometric fluorescent probe comprising MOFs containing Co and Zn and molybdenum oxide quantum dots, wherein the molybdenum oxide quantum dots are supported on a surface of the MOFs containing Co and Zn; wherein a molar ratio of Co to Zn in the ratiometric fluorescent probe is in the range of (0.5-4):1.

2. The ratiometric fluorescent probe according to claim 1, wherein the ratiometric fluorescent probe is configured to detect hydrogen peroxide.

3. The ratiometric fluorescent probe according to claim 1, wherein the ratiometric fluorescent probe is prepared by a method comprising:
   mixing a soluble cobalt salt, a soluble zinc salt, the molybdenum oxide quantum dots, 4,4'-bibenzoic acid and N, N-dimethylformamide; and
   performing a hydrothermal reaction to obtain the ratiometric fluorescent probe.

4. The ratiometric fluorescent probe according to claim 3, wherein a molar ratio of cobalt ion in the soluble cobalt salt to zinc ion in the soluble zinc salt is 0.5-4:1.

5. The ratiometric fluorescent probe according to claim 3, wherein a molar ratio of cobalt ion in the soluble cobalt salt to 4,4'-bibenzoic acid is 1:1.2.

6. The ratiometric fluorescent probe according to claim 4, wherein a molar ratio of cobalt ion in the soluble cobalt salt to 4,4'-bibenzoic acid is 1:1.2.

7. The ratiometric fluorescent probe according to claim 3, wherein a temperature of the hydrothermal reaction is 110-130° C., and a reaction time is 12-24 h.

8. The ratiometric fluorescent probe according to claim 3, wherein the molybdenum oxide quantum dots are prepared by a method comprising the following steps:
   mixing $MoS2$ nano-powders with a $H2O2$ solution to obtain a mixed solution;
   adjusting the pH value of the mixed solution to 6-8, and performing a redox reaction to obtain a redox reactant; and
   centrifuging the redox reactant to obtain the molybdenum oxide quantum dots.

* * * * *